Jan. 5, 1932. J. S. THOMPSON 1,839,510
FRICTION BRAKE
Original Filed March 18, 1926
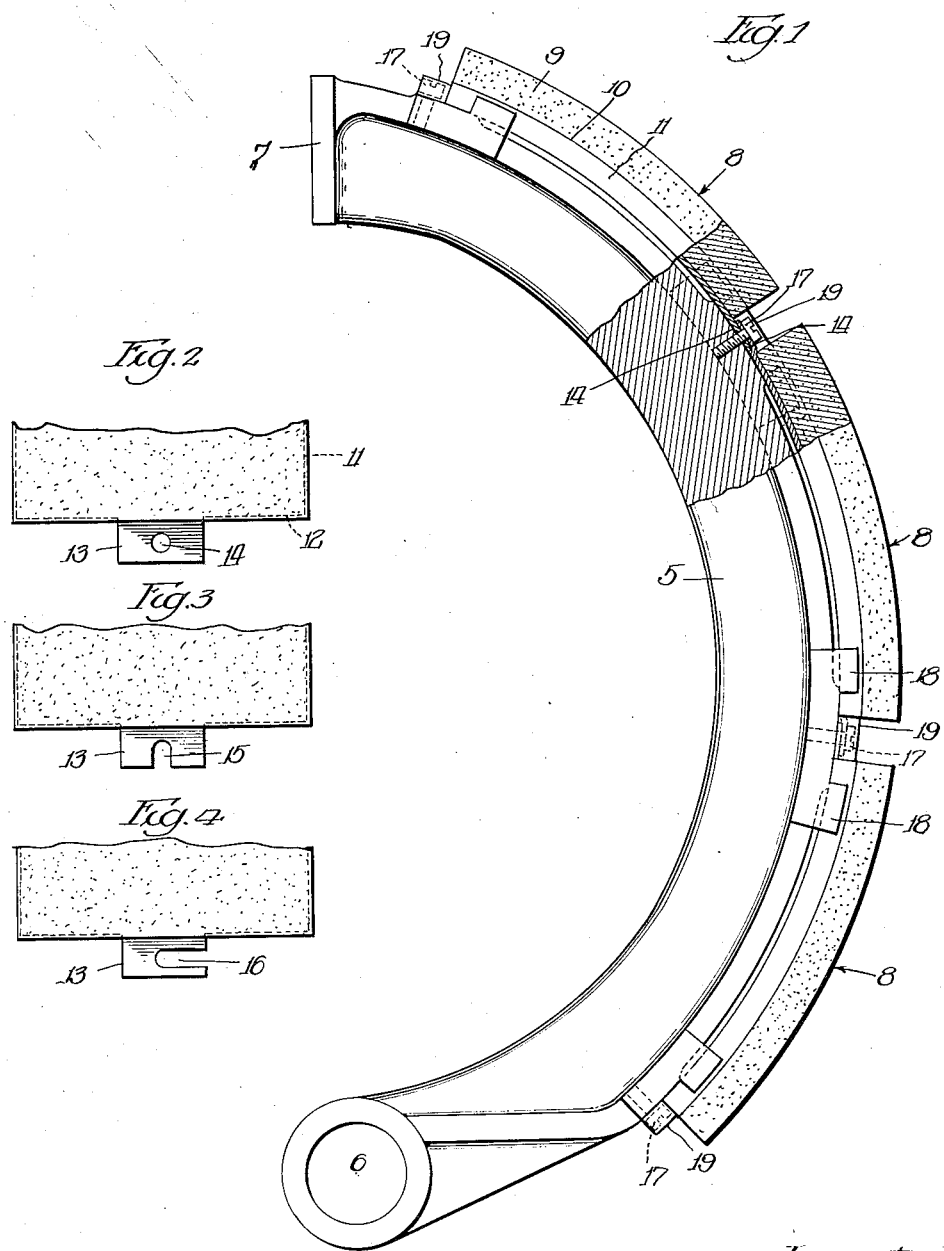

Patented Jan. 5, 1932

1,839,510

UNITED STATES PATENT OFFICE

JAMES S. THOMPSON, OF NEW YORK, N. Y., ASSIGNOR TO AMERICAN BRAKE MATERIALS CORPORATION, OF NEW YORK, N. Y., A CORPORATION OF NEW YORK

FRICTION BRAKE

Original application filed March 18, 1926, Serial No. 95,602. Divided and this application filed December 3, 1928. Serial No. 323,309.

This is a division of my application Serial No. 95,602 filed March 18, 1926.

The invention relates to friction brakes, and while it is particularly adapted for expanding brakes arranged to make frictional contact with a drum, which is a form of brake commonly employed in automotive vehicles, it is also useful in many other installations as will be apparent to those skilled in the art.

The object of the invention is to provide a brake assembly comprising a skeleton head, one or more detachable friction shoes, and novel means of simple construction for securing each shoe on the head whereby the shoe will be securely held in position on the head and may be easily installed and replaced.

For the purposes of this application I have illustrated the invention in several embodiments for an expanding brake for automotive vehicles in the accompanying drawings and referring thereto Fig. 1 is an elevation, partly in section, showing a head provided with three shoes.

Figs. 2, 3 and 4 are detail views showing different specific forms of the fastening means.

Referring to the drawings the head 5 has an eye 6 at one end to engage a pivot stud and its other end is formed or provided with a bearing 7 to be engaged by the cam or any other means (not shown) which may be employed for swinging the head on its pivot to move the shoes 8 into and out of operative contact with a drum. The shoes are suitably seated on the face of the head and each shoe comprises a body 9 and a back 10 which may be in the form of a shell having sides 11 and ends 12. Projections 13 are provided at the ends of the back and if the back is made in the form of a shell, as shown, the projections may be formed by cutting the shell at its ends and bending the projections to extend outwardly from the ends of the shoe. Each projection is provided with an opening which may be in the form of an inclosed opening 14, an end slot 15 or a side slot 16 to receive a fastening bolt 17 which engages the head. When two or more shoes are used on the same head it will be found convenient to overlap the projections of adjacent shoes so that one bolt will engage both projections for fastening the shoes to the head.

The invention provides efficient means of simple construction whereby one or more friction shoes or blocks may be easily and securely fastened in place on the head of a friction brake assembly. The head may be variously constructed for this invention and it may have side guides 18 and end stops 19 as more fully set forth in my original application.

The invention may be embodied with brake heads and brake shoes and brake blocks of different kinds and constructions, and I reserve the right to make any changes in the form, construction and arrangement of parts which may be necessary or desirable in such embodiments, within the scope of the following claims.

I claim:

1. The combination of a brake head, a friction shoe seated on the head and comprising a body and a shell back on the body, said back having upturned ends and said ends being cut between the side edges of the back and bent to provide projections extending outwardly from the ends of the back, said projections having openings therein, and means engaging the openings in said projections and the head for securing the shoe to the head.

2. The combination of a brake head, friction shoes seated on the head in endwise alignment and having shell backs, parts of the backs of less width than the backs projecting from the ends thereof and having openings therein and being disposed in overlapping relation with the openings therein in alignment, and means engaging the aligned openings and the head for securing the shoes to the head.

JAMES S. THOMPSON.